(12) United States Patent
Roeger-Goepfert et al.

(10) Patent No.: US 11,486,049 B2
(45) Date of Patent: Nov. 1, 2022

(54) COMPOSITION FOR METAL ELECTROPLATING COMPRISING LEVELING AGENT

(71) Applicant: BASF SE, Ludwigshafen (DE)

(72) Inventors: Cornelia Roeger-Goepfert, Schwetzingen (DE); Roman Benedikt Raether, Speyer (DE); Harald Hoerhammer, Ludwigshafen (DE); Marco Arnold, Heidelberg (DE); Charlotte Emnet, Stuttgart (DE); Dieter Mayer, Darmstadt (DE)

(73) Assignee: BASF SE, Ludwigshafen (DE)

( * ) Notice: Subject to any disclaimer, the term of this patent is extended or adjusted under 35 U.S.C. 154(b) by 243 days.

(21) Appl. No.: 16/689,710

(22) Filed: Nov. 20, 2019

(65) Prior Publication Data

US 2020/0199767 A1  Jun. 25, 2020

Related U.S. Application Data

(63) Continuation of application No. 13/994,540, filed as application No. PCT/IB2011/055766 on Dec. 19, 2011, now abandoned.

(Continued)

(51) Int. Cl.
*C25D 3/38* (2006.01)
*C08G 73/00* (2006.01)
(Continued)

(52) U.S. Cl.
CPC ............... *C25D 3/38* (2013.01); *C08G 73/00* (2013.01); *C08L 79/00* (2013.01); *C25D 3/32* (2013.01); *C25D 3/58* (2013.01); *C25D 7/123* (2013.01)

(58) Field of Classification Search
None
See application file for complete search history.

(56) References Cited

U.S. PATENT DOCUMENTS

| | | | |
|---|---|---|---|
| 3,428,576 A | 2/1969 | Dickinson et al. | |
| 4,284,576 A * | 8/1981 | Schenk | B01D 3/16 |
| | | | 552/268 |

(Continued)

FOREIGN PATENT DOCUMENTS

| | | |
|---|---|---|
| EP | 1 741 804 | 1/2007 |
| JP | 2000-284240 A | 10/2000 |

(Continued)

OTHER PUBLICATIONS

East, G. C. et al., "Polybiguanides: synthesis and characterization of polybiguanides containing hexamethylene groups", Polymer, vol. 38, No. 15, 1997, pp. 3973-3984.

(Continued)

*Primary Examiner* — Louis J Rufo
(74) *Attorney, Agent, or Firm* — Armstrong Teasdale LLP

(57) ABSTRACT

A method of detecting space debris includes: generating a virtual space debris in accordance with the law of conservation of mass by applying a debris breakup model to an object of breakup origin; calculating an orbit of each virtual space debris based on a debris orbit propagation model; and generating appearance frequency distribution of a motion vector of each virtual space debris on the celestial sphere based on the orbit calculation. The above operations are executed multiple times. The method further includes setting a search range vector based on a motion vector having a high level of the appearance frequency distribution of the motion vector, and applying a stacking method to regions in images captured at time intervals during the fixed point observation, the regions being shifted along the search range vector (Continued)

sequentially in the order of capture, thereby detecting space debris appearing on the images.

16 Claims, 6 Drawing Sheets

Related U.S. Application Data

(60) Provisional application No. 61/425,301, filed on Dec. 21, 2010.

(51) Int. Cl.
*C08L 79/00* (2006.01)
*C25D 3/58* (2006.01)
*C25D 3/32* (2006.01)
*C25D 7/12* (2006.01)

(56) References Cited

U.S. PATENT DOCUMENTS

| | | |
|---|---|---|
| 4,403,078 A | 9/1983 | McCoy et al. |
| 5,741,886 A | 4/1998 | Stockel et al. |
| 2004/0217009 A1* | 11/2004 | Mikkola ............... C25D 3/38 205/296 |
| 2006/0078626 A1 | 4/2006 | Smith |
| 2007/0098813 A1 | 5/2007 | Smith |
| 2010/0243467 A1* | 9/2010 | Michelet ............... C25D 3/40 205/296 |
| 2012/0024711 A1 | 2/2012 | Roeger-Goepfert et al. |
| 2012/0292193 A1 | 11/2012 | Roeger-Goepfert et al. |
| 2013/0020203 A1 | 1/2013 | Roeger-Goepfert et al. |
| 2013/0068626 A1 | 3/2013 | Siemer et al. |

FOREIGN PATENT DOCUMENTS

| | | |
|---|---|---|
| JP | 2002-126051 A | 5/2002 |
| JP | 2005-247906 A | 9/2005 |
| WO | WO 02/40062 A2 | 5/2002 |
| WO | WO 2005/016994 A1 | 2/2005 |
| WO | WO 2007/118985 | 10/2007 |
| WO | WO-2007118985 A1 * | 10/2007 ............... C25D 3/40 |
| WO | WO 2010/069810 A1 | 6/2010 |
| WO | WO 2010/115717 A1 | 10/2010 |
| WO | WO 2010/115756 A1 | 10/2010 |
| WO | WO 2010/115757 A1 | 10/2010 |
| WO | WO 2010/115796 A1 | 10/2010 |
| WO | WO 2011/012462 A2 | 2/2011 |
| WO | WO 2011/012475 A1 | 2/2011 |
| WO | WO 2011/064154 A2 | 6/2011 |

OTHER PUBLICATIONS

International Search Report dated May 3, 2012 in PCT/IB2011/055766 Filed Dec. 19, 2011.

* cited by examiner

COMPOSITION FOR METAL ELECTROPLATING COMPRISING LEVELING AGENT

The invention relates to electroplating compositions comprising a leveling agent.

Filling of small features, such as vias and trenches, by copper electroplating is an essential part of the semiconductor manufacture process. It is well known, that the presence of organic substances as additives in the electroplating bath can be crucial in achieving a uniform metal deposit on a substrate surface and in avoiding defects, such as voids and seams, within the copper lines.

One class of additives are the so-called levelers. Levelers are used to provide a substantially planar surface over the filled features. In literature, a variety of different leveling compounds has been described. In most cases, leveling compounds are N-containing and optionally substituted and/or quaternized polymers, such as polyethylene imine and its derivatives, polyglycine, poly(allylamine), polyaniline (sulfonated), polyvinylpyrrolidone, polyvinylpyridine, polyvinylimidazole, polyurea, polyacrylamide, poly(melamine-co-formaldehyde), polyalkanolamines, etc.

Besides good leveling performance it is essential that the levelers do not interfere with other additives generally used in metal electroplating compositions.

Polymeric biguanide compounds are generally known, e.g. as surfactants, preservatives in cosmetics, and biocidal, fungicidal or bactricidal compositions and the like.

It is an object of the present invention to provide a metal, in particular copper, electroplating additive having good leveling properties, in particular leveling agents capable of providing a substantially planar copper layer and filling features on the nanometer and on the micrometer scale without substantially forming defects, such as but not limited to voids, with a metal electroplating bath, preferably a copper electroplating bath.

It is another object of the present invention to provide a metal, in particular copper, electroplating additive which does not interfere with other additives used for the bottom-up-fill of features comprising small apertures, in particular with accelerators, suppressors and combinations thereof.

It has been surprisingly discovered that polymeric biguanide compounds and derivatives thereof can be used as additives in metal, particularly in copper electroplating baths showing an improved leveling performance without influencing the superfilling, particularly on substrates having apertures below 30 nm.

The present invention is particularly suitable for filling high aspect ratio features having aspect ratios of 4:1 or greater, such as 10:1, and even higher, with copper such that the features are substantially free of voids and preferably completely free of voids. The present invention is suitable for filling features comprising apertures that are greater than 100 nm, and particularly suitable for filling features having apertures of 100 nm or smaller, in particular 30 nm or smaller.

The agents/additives according to the present invention can further advantageously be used for electroplating of copper in through silicon vias (TSV). Such vias normally have widths of several micrometers up to 100 micrometers and large aspect ratios of at least 4, sometimes above 10. Furthermore the agents/additives according to the present invention can advantageously be used in bonding technologies such as the manufacture of copper pillars of typically 50 to 100 micrometers height and width for the bumping process, in circuit board technologies like the manufacture of high-density-interconnects on printed circuit boards using microvia plating or plated-through-hole technologies, or in other packaging processes for electronic circuits.

The present invention provides a composition comprising a source of metal ions, one or more suppressing agents and at least one additive comprising a linear or branched, polymeric biguanide compound comprising the structural unit of formula L1

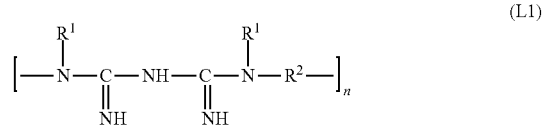

or the corresponding salt of the polymeric biguanide compound formed by the reaction of the biguanide groups with organic or inorganic acids,
wherein
$R^1$ is, each independently, selected from an H atom or an organic radical having from 1 to 20 carbon atoms.
$R^2$ is a divalent organic radical having from 1 to 20 carbon atoms, optionally comprising polymeric biguanide side branches.
n is an integer of 2 or more.

A further embodiment of the present invention is the use of the additives as described herein in a bath for depositing metal containing layers.

Yet another embodiment of the present invention is a process for depositing a metal layer on a substrate by contacting a plating solution as described herein with the substrate, and applying a current to the substrate to deposit a metal layer onto the substrate. The process is particularly useful for depositing metal, particularly copper layers on substrate comprising micrometer and/or submicrometer-sized features.

It has been found that the use of compositions for electroplating according to the present invention provides deposited metal layers, particularly copper layers, having reduced overplating, particularly reduced mounding. The metal layers provided by the present invention are substantially planar, even on substrates exhibiting apertures of a very wide range of different aperture sizes (e.g. from about 30 nanometers to about 2 micrometers). Furthermore it has been found that the present invention provides metal layers substantially without the formation of added defects, such as voids, in the features.

A further significant advantage of this leveling effect is that less material has to be removed in post-deposition operations. For example, chemical mechanical polishing (CMP) is used to reveal the underlying features. The more level deposit of the invention corresponds to a reduction in the amount of metal which must be deposited, therefore resulting in less removal later by CMP. There is a reduction in the amount of scrapped metal and, more significantly, a reduction in the time required for the CMP operation. The material removal operation is also less severe which, coupled with the reduced duration, corresponds to a reduction in the tendency of the material removal operation to impart defects.

Generally, $R^1$ may be, at each position independently, selected from an H atom or an organic radical having from 1 to 20 carbon atoms. The radicals may be branched or unbranched or comprise functional groups which can, for example, contribute to further crosslinking of the polymeric biguanide compound.

Hydrocarbon radicals may preferably be substituted or unsubstituted alkyl, substituted or unsubstituted aryl, substituted or unsubstituted alkylaryl, or substituted or unsubstituted arylalkyl.

The term "alkyl" means C1 to C20 alkyl and includes linear, branched and cyclic alkyl. "Substituted alkyl" means that one or more of the hydrogens on the alkyl group is replaced with another substituent group, such as, but not limited to, cyano, hydroxy, halo, (C1-C6)alkoxy, (C1-C6)alkylthio, thiol, nitro, and the like. As used herein "aryl" includes carbocyclic and heterocyclic aromatic systems, such as, but not limited to, phenyl, naphthyl and the like. By "substituted aryl" is meant that one or more hydrogens on the aryl ring are replaced with one or more substituent groups, such as, but not limited to, cyano, hydroxy, halo, (C1-C6)alkoxy, (C1-C6)alkyl, (C2-C6)alkenyl, (C1-C6)alkylthio, thiol, nitro, and the like. As used herein "alkaryl" includes alkyl substituted carbocyclic and heterocyclic aromatic systems, such as, but not limited to, benzyl, naphthylmethyl and the like which are bound via a aryl moiety. As used herein "arylalkyl" includes alkyl which is substituted by carbocyclic and heterocyclic aromatic systems and which are bound via the alkyl moiety. As used herein "alkylarylalkyl" includes alkyl which is interrupted by carbocyclic and heterocyclic aromatic systems and which are bound via one or more alkyl moiety. As used herein "polymer" generally means any compound comprising at least two monomeric units i.e. the term polymer includes dimers, trimers, etc., oligomers as well as high molecular weight polymers.

As used herein, "feature" refers to the geometries on a substrate, such as, but not limited to, trenches and vias. "Apertures" refer to recessed features, such as vias and trenches. As used herein, the term "plating" refers to metal electroplating, unless the context clearly indicates otherwise. "Deposition" and "plating" are used interchangeably throughout this specification.

As used herein, "accelerator" refers to an organic compound that increases the plating rate of the electroplating bath on at least part of a substrate. The terms "accelerator" and "accelerating agent" are used interchangeably throughout this specification. In literature, sometimes the accelerator component is also named "brightener", "brightening agent" or "anti-suppressor". "Suppressor" refers to an organic compound that decreases the plating rate of the electroplating bath on at least part of a substrate. The terms "suppressors" and "suppressing agents" are used interchangeably throughout this specification. "Leveler" refers to an organic compound that is capable of providing a substantially planar metal layer. The terms "levelers", "leveling agents" and "leveling additive" are used interchangeably throughout this specification.

"Aperture size" according to the present invention means the smallest diameter or free distance of a feature before plating. The terms "opening", "width" and "diameter" are also used, depending on the geometry of the feature (trench, via, etc.), synonymously.

Although the additive according to the present invention has strong leveling properties in electroplating of submicron-sized features the use and performance of the additives according to the present invention is not limited to its leveling properties and may advantageously be used in other metal plating applications, e.g. for depositing through silicon vias (TSV), for other purposes.

The organic radicals $R^1$ and $R^2$ may be aliphatic or aromatic or comprise both aromatic and aliphatic groups.

Preferably, $R^1$ may be, at each position independently, selected from an H atom or an organic radical having from 1 to 10 carbon atoms. More preferably $R^1$ may be selected from a hydrogen atom or substituted or unsubstituted C1 to C10 alkyl radicals. The radicals may be branched or unbranched or comprise functional groups which may, for example, contribute to further crosslinking of the polymeric biguanide compound.

More preferably, $R^1$ is, at each position independently, a hydrogen atom or a hydrocarbon radical having from 1 to 6 carbon atoms which may comprise functional groups such as hydroxyl and amino groups. In a particularly preferred embodiment $R^1$ may be alkyl like methyl, ethyl, propyl, butyl, pentyl or hexyl. In another particularly preferred embodiment $R^1$ may be hydroxyalkyl like hydroxymethyl, hydroxyethyl, hydroxypropyl, hydroxybutyl, hydroxypentyl or hydroxyhexyl. In yet another particularly preferred embodiment $R^1$ may be aminoalkyl like aminomethyl, aminoethyl, aminopropyl, aminobutyl, aminopentyl or aminohexyl.

Most preferably, $R^1$ is selected from an H atom, hydroxyalkyl or aminoalkyl.

Generally, $R^2$ may be any divalent organic radical. The divalent organic radical may not only comprise carbon and hydrogen but also heteroatoms such as oxygen or nitrogen, e.g. in the form of functional groups such as ether groups, hydroxyl groups, amino groups, amide groups or aromatic heterocycles. In case $R^2$ and/or $R^1$ contain one or more primary and/or secondary amino groups the radicals $R^2$ and $R^1$ may contain further polymeric biguanide branches, respectively.

The organic radical $R^2$ may be identical or different and may be, in particular, a linear or branched hydrocarbon diradical which may optionally be substituted or interrupted by functional groups comprising heteroatoms, in particular ether groups or amino groups. In a particular embodiment, $R^2$ is a pure hydrocarbon diradical and does not comprise any functional groups. In a preferred embodiment, $R^2$ is a linear C2 to C8 alkanediyl group, in particular a linear C2 to C6 alkandiyl group like ethane-1,2-diyl, propane-1,3-diyl, butane-1,4-diyl, pentane-1,5-diyl, or hexane-1,6-diyl. In a further embodiment $R^2$ may contain one ore more primary or secondary amino groups capable of inducing polymeric biguanide side branches into the polymeric biguanide compound. In another preferred embodiment, $R^2$ is aryl, arylakyl, particularly alkylarylalkyl. A particularly preferred aryl is 1,3-phenyl, a particularly preferred alkylarylalkyl is xylenediyl.

n may generally be an integer from 2 to about 6000, preferably from about 3 to about 3000, even more preferably from about 3 to about 1000, even more preferably from about 5 to about 300, even more preferably from about 5 to about 200, most preferably from about 5 to about 100.

The mass average molecular weight $M_w$ may generally be from 300 g/mol to 500000 g/mol, preferably from 300 g/mol to 100000 g/mol, more preferably from 300 g/mol to 50000 g/mol, even more preferably from 400 g/mol to 10000 g/mol, even more preferably from 400 g/mol to 5000 g/mol, most preferably from 500 g/mol to 3000 g/mol.

In a preferred embodiment the additive is preparable by reacting
    a dicyanamide compound,
    at least one amino compound comprising at least two primary and/or secondary amino groups, and
    an inorganic or organic protic acid.

Preferably the at least one amino compound is an aliphatic or aromatic diamine, triamine, multiamine, or mixtures thereof. Most preferably the at least one amino compound is a terminal diamine.

In one embodiment the at least one additive may be protonated and comprise a counterion $Y^{o-}$, wherein o is an integer. Preferably o is selected from 1, 2 or 3, most preferably, the counterion $Y^{o-}$ is chloride, sulfate or acetate.

Preferably the metal ions may comprise copper ion.

Preferably the composition may further comprise one or more accelerating agents and/or one or more suppressing agents.

Preferably the substrate comprises micrometer or submicrometer sized features and the deposition is performed to fill the micrometer or submicrometer sized features. Most preferably the micrometer or submicrometer-sized features have a size from 1 to 1000 nm and/or an aspect ratio of 4 or more.

Due to its strong leveling performance the biguanide additives according to the present inventions are also referred to as leveling agent or leveler. Although the additive according to the present invention has strong leveling properties in electroplating of submicron-sized features, the use and performance of the additives according to the present invention is not limited to its leveling properties and may advantageously be used in other metal plating applications, e.g. for filling through silicon vias (TSV), for other purposes.

The present invention provides a plated metal layer, particularly a plated copper layer, on a substrate containing features on the nanometer and/or micrometer scale wherein the metal layer has reduced overplating and all features are substantially free of added voids, and preferably substantially free of voids. "Overplating" refers to a thicker metal deposit over dense feature areas as compared to areas free of features or at least containing relatively few features. "Dense feature areas" means an area exhibiting smaller distances between neighboring features compared to a comparative area containing apertures with a relatively large distance in between. Smaller distances means distances below 2 micrometer, and preferably below 1 micrometer, and even more preferably below 500 nm. Such difference in the plating thickness over dense feature areas as compared to the plating thickness over areas free of features or containing relatively few features is referred to as "step height" or "mounding".

Suitable substrates are any used in the manufacture of electronic devices, such as integrated circuits. Such substrates typically contain a number of features, particularly apertures, having a variety of sizes. Particularly suitable substrates are those having apertures on the nanometer and on the micrometer scale.

The present invention is achieved by combining one or more additives capable of providing a substantially planar copper layer and filling features on the nanometer and on the micrometer scale without substantially forming defects, such as but not limited to voids, with a metal plating bath, preferably a copper electroplating bath.

The levelling agents according to the present invention may be prepared by any preparation method. For example, U.S. Pat. No. 3,428,576 describes the manufacture of polymeric biguanides by reacting a diamine or its inorganic acid salt with a diamine salt of dicyanamide, at least the initial part of the reaction being carried out in the presence of a hydroxylic solvent. Alternatively, the synthesis of polymeric biguanides from the diamine or its inorganic acid salt with a metal salt of dicyanamide such as sodium, copper or calcium dicyanamide is described. U.S. Pat. No. 4,403,078 describes the synthesis of polymeric biguanides by a two-step reaction, starting from the salt formation of polyoxyalkylene diamines and an acid, followed by reaction of the salt with dicyanamide.

U.S. Pat. No. 5,741,886 describes the synthesis of linear polymeric biguanides or biguanidinium salts thereof wherein the polymeric chain is terminated at the cyanoguanidine end group by a primary or secondary monoamine.

A preferred process for preparation is performed by reacting (a) a dicyanamide compound, preferably sodium dicyanamide,
(b) at least one amino compound comprising at least two primary and/or secondary amino groups, and
(c) at least one organic or inorganic acid.

As used herein, "primary amino group" means an amino group comprising two H atoms, "secondary amino group" means an amino group comprising one H atom.

The preparation may be performed by reacting components (a), (b) and (c) or, alternatively, the corresponding salt of the amino compound (b) may be first formed by reacting the amino groups of amino compound (b) with the organic or inorganic acid (c) and then reacting this salt with the dicyanamide compound (a).

Optionally a hydroxylic solvent or a mixture of a hydroxylic solvent and water may be used.

By way of example, if using hydrochloric acid and sodium dicyanamide, the reaction proceeds in principle according to the following reaction equation.

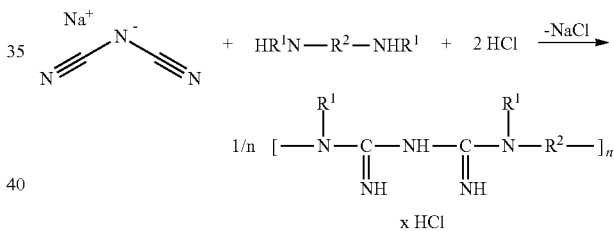

Here, 1 mol of the dicyanamide component (a), 2 mol of primary and/or secondary amino groups of the amino compound (b) and 2 mol of acid group ($H^+$) of the protic acid (c) are required per 1 mol of biguanide compound. In the polymer obtained, the biguanide groups are joined to one another by the diamine.

In the present case, a sodium salt is formed as a side product.

The dicyanamide component (a) may be any salt of dicyanamide, preferably a metal salt like sodium dicyanamide. However, it is also possible to use any other cations, e.g. organic cations, as a counter-ion.

The amino compound (b) is a compound comprising at least two primary and/or secondary amino groups.

The amino compound may be represented by a polyamine having at least two primary and/or secondary amino groups.

If amino compounds comprising two primary or secondary amino groups are used in the reaction, linear, polymeric biguanide compounds are formed. If amino compounds having more than two primary and/or secondary amino groups are used, polymeric biguanide branches are introduced into the polymer by reaction of the additional amino groups with the dicyanamide component and thus branched polymeric biguanide compounds are formed.

Generally the amino compound may comprise 2 to 6 primary and/or secondary amino groups, preferably 2 or 3 primary and/or secondary amino groups, most preferably 2 primary and/or secondary amino groups.

Generally, the amino compound may be described by the general formula L2

$$R^1\text{---}NH\text{---}R^3\text{---}NH\text{---}R^1 \quad (L2)$$

If the amino compound comprises 2 primary and/or secondary amino groups $R^3$ corresponds to $R^2$ in formula L1, otherwise $R^2$ is formed from $R^3$ by reaction of the additional amino groups to form polymeric biguanide side branches.

In a preferred embodiment, the amino compound comprises linear or branched alkyl and/or aryl groups and apart from these no further functional groups or further functional groups such as ether groups, hydroxyl groups, amino groups, and/or amide groups are present. Preferably, the amino compound is an aliphatic amine comprising at least two primary and/or secondary amino groups.

Possible amino compounds are diamines in which two primary and/or secondary amino groups are bound to an aliphatic hydrocarbon radical, preferably an aliphatic hydrocarbon radical having from 2 to 20 carbon atoms, more preferably from 2 to 12 carbon atoms, most preferably from 2 to 6 carbon atoms.

Further possible amino compounds are amino compounds, preferably diamines, in which primary amino groups are bound directly to an aromatic rings system, e.g. a phenylene group, or amino compounds in which the primary amino groups are bound to aliphatic groups as alkyl substituents of an aromatic ring system.

Diamines which may be mentioned are, in particular, C2 to C12-alkylenediamines such as 1,2-ethylenediamine, 1,3-propylenediamine, 1,4-butylenediamine, 1,5-pentylenediamine, 1,6-hexylenediamine, 1,8-octylenediamine, isophorone diamine (3-aminomethyl-3,5,5-trimethyl cyclohexylamine) and neopentanediamine, aryldiamines such as 1,3-phenylenediamine, 1,4-phenylenediamine and 4,4'-methylenedianiline, oligo- and polyetherdiamines such as 4,7,10-trioxatridecane-1,13-diamine and 4,9-dioxadodecane-1,12-diamine and diamines comprising secondary amino groups such as N-(2-aminoethyl)ethanolamine, piperazine, 3-(cylcohexylamino)propylamine and 3-(methylamino)propylamine.

Triamines which may be mentioned are, in particular, diethylenetriamine, 3-(2-aminoethylamino)propylamine, dipropylene triamine and N,N-bis-(3-aminopropyl)methylamine.

It is also possible to use mixtures of amino compounds, it is possible to use, for example, mixtures of various aliphatic amino compounds or mixtures of various aromatic amino compounds and also mixtures of aliphatic and aromatic amino compounds. The amino compounds in the mixtures can be amino compounds having different numbers of primary and/or secondary amino groups. When diamines are used in the process of the invention, linear polymers are obtained.

When amino compounds having three or more primary and/or secondary amino groups are used, crosslinked and/or branched structures are formed. The use of diamines in admixture with amino compounds having more than two primary and/or secondary amino groups, e.g. triamines, enables the desired degree of crosslinking or degree of branching to be set via the proportion of triamines. In this case it is preferred to use the amino compounds having three or more primary and/or secondary amino groups in a molar ratio to the diamine(s) of 1:2 or below, more preferred 1:5 or below, and most preferred 1:10 or below.

In a preferred embodiment, the amino compound has a molecular weight of less than 10000 g/mol, more preferably less than 5000 g/mol, most preferably less than 1000 g/mol, in particular less than 500 g/mol.

Particularly useful diamines and triamines are, in particular, compounds having a molecular weight of from 45 to 500 g/mol, most preferably from 60 to 300 g/mol.

In the process of the invention, it is possible to use further compounds, e.g. in order to introduce specific end groups into the polymer.

Thus, if desired, it is possible to make concomitant use of, for example, compounds having only one primary and/or secondary amino group. The compound having only one primary and/or secondary amino group leads to chain termination and then forms the end group of the polymer chain concerned. The higher the proportion of compounds having only one primary and/or secondary amino group the lower the molecular weight.

The organic or inorganic acid may generally be characterized by formula $(H^+)_o Y^{o-}$, wherein o is an integer. In a preferred embodiment, o is an integer from 1 to 4, particularly preferably o is 1 or 2. In a particular embodiment, o is 1.

The anion $Y^{o-}$ of the protic acid forms the counterion to the biguanidinium salt of the polymeric compound.

The anion of the protic acid is, for example, selected from $F^-$, $Cl^-$, $NO_2^-$, $NO_3^-$, the group of sulfates, sulfites and sulfonates, e.g. $SO_4^{2-}$, $HSO_4^-$, $SO_3^{2-}$, $HSO_3^-$, $H_3COSO_3^-$, $H_3CSO_3^-$, phenylsulfonate, p-tolylsulfonate, the group of phosphates, phosphonates, phosphinates, phosphites, phosphonites and phosphinites, e.g. $PO_4^{3-}$, $HPO_4^{2-}$, $H_2PO_4^-$, $PO_3^{3-}$, $HPO_3^{2-}$, $H_2PO_3^-$, and the group of halogenated hydrocarbons, e.g. $CF_3SO_3^-$, $(CF_3SO_3)_2N^-$, $CF_3CO_2^-$ and $CCl_3CO_2^-$ The acid may also be a polymeric protic acid, e.g. polyacrylic acid; in this case, o can assume very high values. As such polymeric protic acids, mention may be made of, for example, polyacrylic acid, polymethacrylic acid or another polymer having a plurality of carboxyl groups.

The products received in this way may be subjected to a typical anion exchange by means of precipitation or by anion exchange resins to receive a desired counter-ion.

The reaction of the starting compounds is preferably carried out without adding a solvent or in a hydroxylic solvent or in mixtures of a hydroxylic solvent and water. Hydroxylic solvents are, in particular, methanol, ethanol, 1-propanol, 2-propanol, 1-butanol, 2-butanol and higher alkylene alcohols.

The reaction is preferably carried out without adding a solvent.

The reaction of the starting components can be carried out at, for example, pressures from 0.1 to 10 bar, in particular atmospheric pressure, and, for example, at temperatures from 5 to 200° C., in particular from 10 to 200° C., particularly preferably from 20 to 190° C.

The starting components can be combined in any order.

In a further particular embodiment, all amino starting components and all dicyanamide starting compounds are mixed beforehand and, if the amino starting component is used as a free base, this is followed by the addition of an organic or inorganic acid $(H^+)_o Y^{o-}$.

In a further particular embodiment, the amino starting components are used as salts of an organic or inorganic acid $(H^+)_o Y^{o-}$ being mixed together with the dicyanamide starting components and a hydroxylic solvent beforehand.

It will be appreciated by those skilled in the art that more than one leveling agent may be used. When two or more leveling agents are used, at least one of the leveling agents is a polymeric biguanide compound or a derivative thereof as described herein. It is preferred to use only one biguanide leveling agent in the plating bath composition.

Suitable additional leveling agents include, but are not limited to, polyaminoamide and derivatives thereof, polyalkanolamine and derivatives thereof, polyethylene imine and derivatives thereof, quaternized polyethylene imine, polyglycine, poly(allylamine), polyaniline, polyurea, polyacrylamide, poly(melamine-co-formaldehyde), reaction products of amines with epichlorohydrin, reaction products of an amine, epichlorohydrin, and polyalkylene oxide, reaction products of an amine with a polyepoxide, polyvinylpyridine, polyvinylimidazole, polyvinylpyrrolidone, or copolymers thereof, nigrosines, pentamethyl-para-rosaniline hydrohalide, hexamethyl-pararosaniline hydrohalide, or compounds containing a functional group of the formula N—R—S, where R is a substituted alkyl, unsubstituted alkyl, substituted aryl or unsubstituted aryl. Typically, the alkyl groups are (C1-C6)alkyl and preferably (C1-C4)alkyl. In general, the aryl groups include (C6-C20)aryl, preferably (C6-C10)aryl. Such aryl groups may further include heteroatoms, such as sulfur, nitrogen and oxygen. It is preferred that the aryl group is phenyl or napthyl. The compounds containing a functional group of the formula N—R—S are generally known, are generally commercially available and may be used without further purification.

In such compounds containing the N—R—S functional group, the sulfur ("S") and/or the nitrogen ("N") may be attached to such compounds with single or double bonds. When the sulfur is attached to such compounds with a single bond, the sulfur will have another substituent group, such as but not limited to hydrogen, (C1-C12)alkyl, (C2-C12)alkenyl, (C6-C20)aryl, (C1-C12)alkylthio, (C2-C12)alkenylthio, (C6-C20)arylthio and the like. Likewise, the nitrogen will have one or more substituent groups, such as but not limited to hydrogen, (C1-C12)alkyl, (C2-C12)alkenyl, (C7-C10)aryl, and the like. The N—R—S functional group may be acyclic or cyclic. Compounds containing cyclic N—R—S functional groups include those having either the nitrogen or the sulfur or both the nitrogen and the sulfur within the ring system.

Further leveling agents are trialkanolamine condensates, polyamidoamines, polyalkoxylated polyethylene imines, and polyimidazolium compounds as described in international WO 2010/069810, unpublished International Patent Application No. PCT/EP2010/067874, U.S. provisional application No. 61/315,051, and U.S. provisional application No. 61/350,045, respectively.

In general, the total amount of leveling agents in the electroplating bath is from 0.5 ppm to 10000 ppm based on the total weight of the plating bath. The leveling agents according to the present invention are typically used in a total amount of from about 0.1 ppm to about 1000 ppm based on the total weight of the plating bath and more typically from 1 to 100 ppm, although greater or lesser amounts may be used.

The electroplating baths according to the present invention may include one or more optional additives. Such optional additives include, but are not limited to, accelerators, suppressors, surfactants and the like. Such suppressors and accelerators are generally known in the art. It will be clear to one skilled in the art which suppressors and/or accelerators to use and in what amounts.

A large variety of additives may typically be used in the bath to provide desired surface finishes for the Cu plated metal. Usually more than one additive is used with each additive forming a desired function. Advantageously, the electroplating baths may contain one or more of accelerators, suppressors, sources of halide ions, grain refiners and mixtures thereof. Most preferably the electroplating bath contains both, an accelerator and a suppressor in addition to the leveling agent according to the present invention. Other additives may also be suitably used in the present electroplating baths.

Any accelerators may be advantageously used in the present invention. Accelerators useful in the present invention include, but are not limited to, compounds comprising one or more sulphur atom and a sulfonic/phosphonic acid or their salts.

The generally preferred accelerators have the general structure $M^4O_3X^4-R^{41}-(S)_d-R^{42}$, with:

$M^4$ is a hydrogen or an alkali metal, preferably Na or K,
$X^4$ is P or S
d is an integer from 1 to 6, preferably from 2 to 3, most preferably 2,
$R^{41}$ is selected from C1-C8 alkyl group or heteroalkyl group, an aryl group or a heteroaromatic group. Heteroalkyl groups will have one or more heteroatom (N, S, O) and 1-12 carbons. Carbocyclic aryl groups are typical aryl groups, such as phenyl, naphtyl. Heteroaromatic groups are also suitable aryl groups and contain one or more N, O or S atom and 1-3 separate or fused rings.
$R^{42}$ is selected from H or ($-S-R^{41'}X^{4'}O_3M^{4'}$), with $R^{41'}$ being selected among $R^{41}$, wherein $R^{41'}$ may be identical to or different from $R^{41}$, $X^{4'}$ being selected among $X^4$, wherein $X^{4'}$ may be identical to or different from $X^4$, and
$M^{4'}$ is selected from $M^4$, wherein $M^{4'}$ may be identical to or different from $M^4$.
being selected among $M^4$, wherein $M^{4'}$ may be identical to or different from $M^4$.

More specifically, useful accelerators include those of the following formulae:

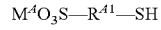

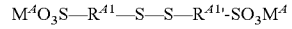

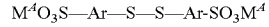

with $R^{41}$, $M^4$ as defined above and Ar is Aryl.
Particularly preferred accelerating agents are:
SPS: bis-(3-sulfopropyl)-disulfide, preferably its disodium salt, and
MPS: 3-mercapto-1-propanesulfonic acid, preferably its sodium salt.

Other examples of accelerators, used alone or in mixture, include, but are not limited to: MES (2-Mercaptoethanesulfonic acid, sodium salt); DPS (N,N-dimethyldithiocarbamic acid (3-sulfopropylester), sodium salt); UPS (3[(amino-iminomethyl)-thio]-1-propylsulfonic acid); ZPS (3-(2-benzthiazolylthio)-1-propanesulfonic acid, sodium salt); 3-mercapto-propylsulfonicacid-(3-sulfopropyl)ester; methyl-(ω-sulphopropyl)-disulfide, disodium salt; methyl-(ω-sulphopropyl)-trisulfide, disodium salt.

Such accelerators are typically used in an amount of about 0.1 ppm to about 3000 ppm, based on the total weight of the plating bath. Particularly suitable amounts of accelerator useful in the present invention are 1 to 500 ppm, and more particularly 2 to 100 ppm.

Any suppressing agent may be advantageously used in the present invention. Suppressing agents useful in the present invention include, but are not limited to, polymeric materials, particularly those having heteroatom substitution, and more particularly oxygen substitution. It is preferred that the suppressing agent is a polyalkyleneoxide. Suitable suppressing agents include polyethylene glycol copolymers, particularly polyethylene glycol polypropylene glycol copolymers. The arrangement of ethylene oxide and propylene oxide of suitable suppressors may be block, gradient, or random. The polyalkylene glycol may comprise further alkylene oxide building blocks such as butylene oxide. Preferably, the average molecular weight of suitable suppressors exceeds about 2000 g/mol. The starting molecules of suitable polyalkylene glycol may be alkyl alcohols such as methanol, ethanol, propanol, n-butanol and the like, aryl alcohols such as phenols and bisphenols, alkaryl alcohols such as benzyl alcohol, polyol starters such as glycol, glycerin, trimethylol propane, pentaerythritol, sorbitol, carbohydrates such as saccharose, and the like, amines and oligoamines such as alkyl amines, aryl amines such as aniline, triethanol amine, ethylene diamine, and the like, amides, lactams, heterocyclic amines such as imidazol and carboxylic acids. Optionally, polyalkylene glycol suppressors may be functionalized by ionic groups such as sulfate, sulfonate, ammonium, and the like.

Particularly useful suppressing agents in combination with the levelers according to the present inventions are:
(a) suppressing agents obtainable by reacting an amine compound comprising at least three active amino functional groups with a mixture of ethylene oxide and at least one compound selected from $C_3$ and $C_4$ alkylene oxides as described in WO 2010/115796.
  Preferably the amine compound is selected from diethylene triamine, 3-(2-aminoethyl)aminopropylamine, 3,3'-iminodi(propylamine), N,N-bis(3-aminopropyl)methylamine, bis(3-dimethylaminopropyl)amine, triethylenetetraamine and N,N'-bis(3-aminopropyl)ethylenediamine.
(b) Suppressing agents obtainable by reacting an amine compound comprising active amino functional groups with a mixture of ethylene oxide and at least one compound selected from $C_3$ and $C_4$ alkylene oxides, said suppressing agent having a molecular weight $M_w$ of 6000 g/mol or more, forming an ethylene C3 and/or C4 alkylene random copolymer as described in WO 2010/115756.
(c) Suppressing agent obtainable by reacting an amine compound comprising at least three active amino functional groups with ethylene oxide and at least one compound selected from C3 and C4 alkylene oxides from a mixture or in sequence, said suppressing agent having a molecular weight $M_w$ of 6000 g/mol or more as described in WO 2010/115757.
  Preferably the amine compound is selected from ethylene diamine, 1,3-diaminopropane, 1,4-diaminobutane, 1,5-diaminopentane, 1,6-diaminohexane, neopentanediamine, isophoronediamine, 4,9-dioxadecane-1,12-diamine, 4,7,10-trioxatridecane-1,13-diamine, triethylene glycol diamine, diethylene triamine, (3-(2-aminoethyl)aminopropylamine, 3,3'-iminodi(propylamine), N,N-bis(3-aminopropyl)methylamine, bis(3-dimethylaminopropyl)amine, triethylenetetraamine and N,N'-bis(3-aminopropyl)ethylenediamine.
(d) Suppressing agent selected from compounds of formula S1

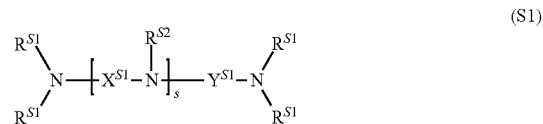

(S1)

wherein the $R^{S1}$ radicals are each independently selected from a copolymer of ethylene oxide and at least one further $C_3$ to $C_4$ alkylene oxide, said copolymer being a random copolymer, the $R^{S2}$ radicals are each independently selected from $R^{S1}$ or alkyl, $X^{S1}$ and $Y^{S1}$ are spacer groups independently, and $X^{S1}$ for each repeating unit independently, selected from $C_2$ to $C_6$ alkylene and $Z^{S1}$—(O—$Z^{S1}$)$_t$ wherein the $Z^{S1}$ radicals are each independently selected from $C_2$ to $C_6$ alkylene, s is an integer equal to or greater than 0, and t is an integer equal to or greater than 1, as described in WO 2010/115717.

Preferably spacer groups $X^{S1}$ and $Y^{S1}$ are independently, and $X^{S1}$ for each repeating unit independently, selected from $C_2$ to $C_4$ alkylene. Most preferably $X^{S1}$ and $Y^{S1}$ are independently, and $X^{S1}$ for each repeating unit independently, selected from ethylene (—$C_2H_4$—) or propylene (—$C_3H_6$—).

Preferably $Z^{S1}$ is selected from $C_2$ to $C_4$ alkylene, most preferably from ethylene or propylene.

Preferably s is an integer from 1 to 10, more preferably from 1 to 5, most preferably from 1 to 3. Preferably t is an integer from 1 to 10, more preferably from 1 to 5, most preferably from 1 to 3.

In another preferred embodiment the $C_3$ to $C_4$ alkylene oxide is selected from propylene oxide (PO). In this case EO/PO copolymer side chains are generated starting from the active amino functional groups.

The content of ethylene oxide in the copolymer of ethylene oxide and the further $C_3$ to $C_4$ alkylene oxide can generally be from about 5% by weight to about 95% by weight, preferably from about 30% by weight to about 70% by weight, particularly preferably between about 35% by weight to about 65% by weight.

The compounds of formula (S1) are prepared by reacting an amine compound with one or more alkylene oxides. Preferably the amine compound is selected from ethylene diamine, 1,3-diaminopropane, 1,4-diaminobutane, 1,5-diaminopentane, 1,6-diaminohexane, neopentanediamine, isophoronediamine, 4,9-dioxadecane-1,12-diamine, 4,7,10-trioxatridecane-1,13-diamine, triethylene glycol diamine, diethylene triamine, (3-(2-aminoethyl)amino)propylamine, 3,3'-iminodi(propylamine), N,N-bis(3-aminopropyl)methylamine, bis(3-dimethylaminopropyl)amine, triethylenetetraamine and N,N'-bis(3-aminopropyl)ethylenediamine.

The molecular weight $M_w$ of the suppressing agent of formula S1 may be between about 500 g/mol to about 30000 g/mol. Preferably the molecular weight $M_w$ should be about 6000 g/mol or more, preferably from about 6000 g/mol to about 20000 g/mol, more preferably from about 7000 g/mol to about 19000 g/mol, and most preferably from about 9000 g/mol to about 18000 g/mol. Preferred total amounts of alkylene oxide units in the suppressing agent may be from about 120 to about 360, preferably from about 140 to about 340, most preferably from about 180 to about 300.

Typical total amounts of alkylene oxide units in the suppressing agent may be about 110 ethylene oxide units (EO) and 10 propylene oxide units (PO), about 100 EO and 20 PO, about 90 EO and 30 PO, about 80 EO and 40 PO, about 70 EO and 50 PO, about 60 EO and 60 PO, about 50 EO and 70 PO, about 40 DO and 80 PO, about 30 EO and 90 PO, about 100 EO and 10 butylene oxide (BuO) units, about 90 EO and 20 BO, about 80 EO and 30 BO, about 70 EO and 40 BO, about 60 EO and 50 BO or about 40 EO and 60 BO to about 330 EO and 30 PO units, about 300 EO and 60 PO, about 270 EO and 90 PO, about 240 EO and 120 PO, about 210 EO and 150 PO, about 180 EO and 180 PO, about 150 EO and 210 PO, about 120 EO and 240 PO, about 90 EO and 270 PO, about 300 EO and 30 butylene oxide (BuO) units, about 270 EO and 60 BO, about 240 EO and 90 BO, about 210 EO and 120 BO, about 180 EO and 150 BO, or about 120 EO and 180 BO.

(e) Suppressing agent obtainable by reacting a polyhydric alcohol condensate compound derived from at least one polyalcohol of formula $X^{S2}(OH)_u$ by condensation with at least one alkylene oxide to form a polyhydric alcohol condensate comprising polyoxyalkylene side chains, wherein u is an integer from 3 to 6 and $X^{S2}$ is an u-valent linear or branched aliphatic or cycloaliphatic radical having from 3 to 10 carbon atoms, which may be substituted or unsubstituted, as described in International Patent Application No. PCT/EP2010/060276. Preferred polyalcohol condensates are selected from compounds of formulae

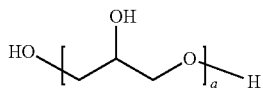 (S2a)

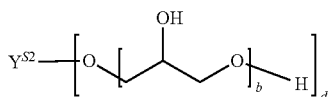 (S2b)

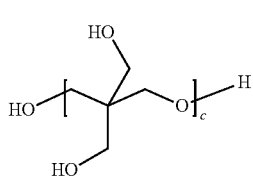 (S2c)

wherein $Y^{S2}$ is an u-valent linear or branched aliphatic or cycloaliphatic radical having from 1 to 10 carbon atoms, which may be substituted or unsubstituted, a is an integer from 2 to 50, b may be the same or different for each polymer arm d and is an integer from 1 to 30, c is an integer from 2 to 3, and d is an integer from 1 to 6. Most preferred Polyalcohols are glycerol condensates and/or pentaerythritol condensates.

(f) Suppressing agent obtainable by reacting a polyhydric alcohol comprising at least 5 hydroxyl functional groups with at least one alkylene oxide to form a polyhydric alcohol comprising polyoxyalkylene side chains as described in International Patent Application No. PCT/EP2010/060375. Preferred polyalcohols are linear or cyclic monosaccharide alcohols represented by formula (S3a) or (S3b)

  (S3a)

  (S3b)

wherein v is an integer from 3 to 8 and w is an integer from 5 to 10. Most preferred monosaccharide alcohols are sorbitol, mannitol, xylitol, ribitol and inositol. Further preferred polyalcohols are monosaccharides of formula (S4a) or (S4b)

  (S4a)

  (S4b)

wherein x is an integer of 4 to 5, and y, z are integers and y+z is 3 or 4. Most preferred monosaccharide alcohols are selected from the aldoses allose, altrose, galactose, glucose, gulose, idose, mannose, talose, glucoheptose, mannoheptose or the ketoses fructose, psicose, sorbose, tagatose, mannoheptulose, sedoheptulose, taloheptulose, alloheptulose.

These are particularly effective, strong suppressing agents that cope with the seed overhang issue and provide substantially defect free trench filling despite a non-conformal copper seed.

When suppressors are used, they are typically present in an amount in the range of from about 1 to about 10,000 ppm based on the weight of the bath, and preferably from about 5 to about 10,000 ppm.

The metal ion source may be any compound capable of releasing metal ions to be deposited in the electroplating bath in sufficient amount, i.e. is at least partially soluble in the electroplating bath. It is preferred that the metal ion source is soluble in the plating bath. Suitable metal ion sources are metal salts and include, but are not limited to, metal sulfates, metal halides, metal acetates, metal nitrates, metal fluoroborates, metal alkylsulfonates, metal arylsulfonates, metal sulfamates, metal gluconates and the like. It is preferred that the metal is copper. It is further preferred that the source of metal ions is copper sulfate, copper chloride, copper acetate, copper citrate, copper nitrate, copper fluoroborate, copper methane sulfonate, copper phenyl sulfonate and copper p-toluene sulfonate. Copper sulfate pentahydrate and copper methane sulfonate are particularly preferred. Such metal salts are generally commercially available and may be used without further purification.

Besides metal electroplating the compositions may be used in electroless deposition of metal containing layers. The compositions may particularly be used in the deposition of barrier layers containing Ni, Co, Mo, W and/or Re. In this case, besides metal ions, further elements of groups III and V, particularly B and P may be present in the composition for electroless deposition and thus co-deposited with the metals.

The metal ion source may be used in the present invention in any amount that provides sufficient metal ions for electroplating on a substrate. Suitable metal ion metal sources include, but are not limited to, tin salts, copper salts, and the like. When the metal is copper, the copper salt is typically present in an amount in the range of from about 1 to about 300 g/l of plating solution. It will be appreciated mixtures of metal salts may be electroplated according to the present invention. Thus, alloys, such as copper-tin having up to about 2 percent by weight tin, may be advantageously plated according to the present invention. The amounts of each of the metal salts in such mixtures depend upon the particular alloy to be plated and is well known to those skilled in the art.

In general, besides the metal ion source and at least one of the leveling agents, further referred to as polymeric biguanide compounds, the present metal electroplating compositions preferably include electrolyte, i. e. acidic or alkaline electrolyte, one or more sources of metal ions, optionally halide ions, and optionally other additives like accelerators and/or suppressors. Such baths are typically aqueous. The water may be present in a wide range of amounts. Any type of water may be used, such as distilled, deionized or tap.

The electroplating baths of the present invention may be prepared by combining the components in any order. It is preferred that the inorganic components such as metal salts, water, electrolyte and optional halide ion source, are first added to the bath vessel followed by the organic components such as leveling agents, accelerators, suppressors, surfactants and the like.

Typically, the plating baths of the present invention may be used at any temperature from 10 to 65 degrees C. or higher. It is preferred that the temperature of the plating baths is from 10 to 35 degrees C. and more preferably from 15 degrees to 30 degrees C.

Suitable electrolytes include such as, but not limited to, sulfuric acid, acetic acid, fluoroboric acid, alkylsulfonic acids such as methanesulfonic acid, ethanesulfonic acid, propanesulfonic acid and trifluoromethane sulfonic acid, arylsulfonic acids such as phenyl sulfonic acid and toluenesulfonic acid, sulfamic acid, hydrochloric acid, phosphoric acid, tetraalkylammonium hydroxide, preferably tetramethylammonium hydroxide, sodium hydroxide, potassium hydroxide and the like. Acids are typically present in an amount in the range of from about 1 to about 300 g/l, alkaline electrolytes are typically present in an amount of about 0.1 to about 20 g/l or to yield a pH of 8 to 13 respectively, and more typically to yield a pH of 9 to 12.

Such electrolytes may optionally contain a source of halide ions, such as chloride ions as in copper chloride or hydrochloric acid. A wide range of halide ion concentrations may be used in the present invention such as from about 0 to about 500 ppm. Typically, the halide ion concentration is in the range of from about 10 to about 100 ppm based on the plating bath. It is preferred that the electrolyte is sulfuric acid or methanesulfonic acid, and preferably a mixture of sulfuric acid or methanesulfonic acid and a source of chloride ions. The acids and sources of halide ions useful in the present invention are generally commercially available and may be used without further purification.

BRIEF DESCRIPTION OF THE SEVERAL VIEWS OF THE DRAWINGS

The general process of copper electrodeposition on semiconductor integrated circuit substrates is described with respect to FIGS. 1A-6B without restricting the invention thereto. The figures show:

FIG. 1A A schematic view of a dielectric substrate 1 seeded with a copper layer 2a.

With reference to FIG. 1A a dielectric substrate 1 is first seeded with a copper layer 2a. With reference to FIG. 1B a copper layer 2' is then deposited onto the dielectric substrate 1 by electrodeposition. The trenches 2c of the substrate 1 are filled and an overplating of copper 2b, also referred to as "overburden", is generated on top of the whole structured substrate. During the process, after optional annealing, the overburden of copper 2b is removed by chemical mechanical planarization (CMP), as depicted in FIG. 1C.

Figure 1A:
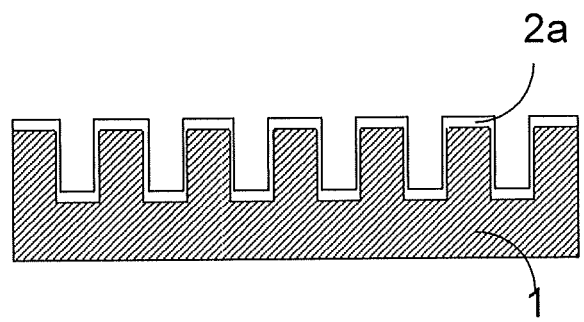
Figure 1B:
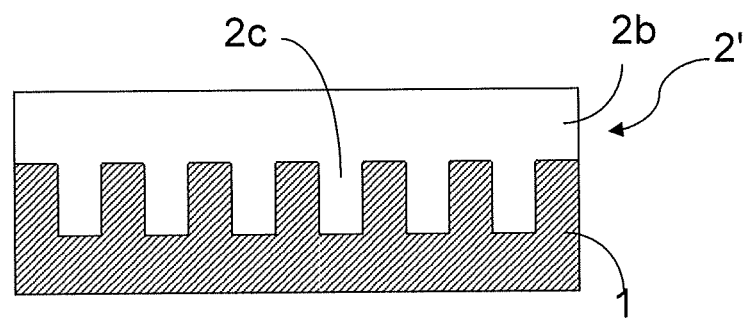
FIG. 1B A schematic view of a copper layer 2' deposited onto the dielectric substrate 1 by electrodeposition.
Figure 1C:
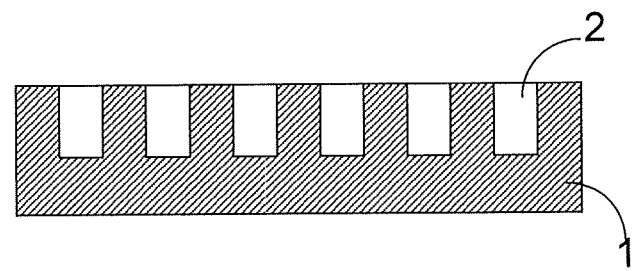
FIG. 1C A schematic view of a copper deposited onto the dielectric substrate 1 by electrodeposition after chemical mechanical planarization (CMP).
Figure 2A:
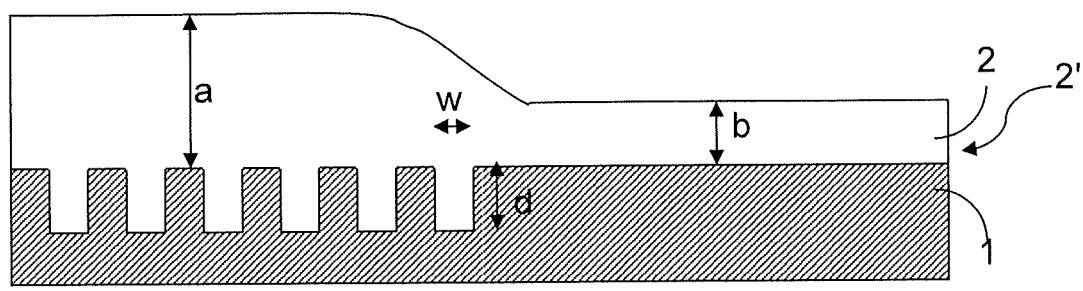
FIG. 2A A schematic view of a substrate 1 comprising a first area patterned with densely arranged parallel features and a second non-patterned area after copper electrodeposition without using a leveler.
Figure 2B:
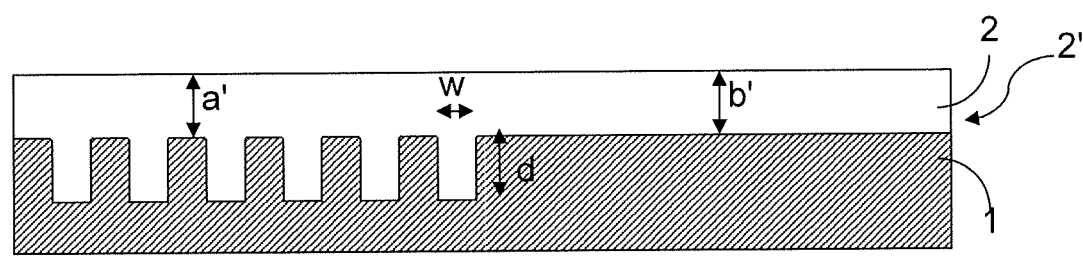
FIG. 2B A schematic view as depicted in FIG. 2A after copper electrodeposition by using a leveler according to the invention.

The effect of a leveling agent is generally described with respect to FIGS. 2A and 2B. The mounding may be determined by profilometry measuring the step height (distance a minus distance b) between patterned and unpatterned areas. Without a leveling agent the deposition leads to a high ratio a/b>>1. In contrast, the aim is to reduce the ratio a/b to a value, which is as close as possible to 1.

A particular advantage of the present invention is that overplating, particularly mounding, is reduced or substantially eliminated. Such reduced overplating means less time and effort is spent in removing metal, such as copper, during subsequent chemical-mechanical planarization (CMP) processes, particularly in semiconductor manufacture. A further advantage of the present invention is that a wide range of aperture sizes may be filled within a single substrate resulting in a substantially even surface having a ratio a/b of 1.5 or less, preferably 1.2 or less, most preferably 1.1 or less.

Thus, the present invention is particularly suitable to evenly filling apertures in a substrate having a variety of aperture sizes, such as from 0.01 micrometer to 100 micrometer or even larger.

A further significant advantage of this leveling effect is that less material has to be removed in post-deposition operations. For example, chemical mechanical planarization (CMP) is used to reveal the underlying features. The more level deposit of the invention corresponds to a reduction in the amount of metal which must be deposited, therefore resulting in less removal later by CMP. There is a reduction in the amount of scrapped metal and, more significantly, a reduction in the time required for the CMP operation. The material removal operation is also less severe which, coupled with the reduced duration, corresponds to a reduction in the tendency of the material removal operation to impart defects.

Metal, particularly copper, is deposited in apertures according to the present invention without substantially forming voids within the metal deposit. By the term "without substantially forming voids", it is meant that 95% of the plated apertures are void-free. It is preferred that the plated apertures are void-free.

Typically, substrates are electroplated by contacting the substrate with the plating baths of the present invention. The substrate typically functions as the cathode. The plating bath contains an anode, which may be soluble or insoluble. Optionally, cathode and anode may be separated by a membrane. Potential is typically applied to the cathode. Sufficient current density is applied and plating performed for a period of time sufficient to deposit a metal layer, such as a copper layer, having a desired thickness on the substrate. Suitable current densities, include, but are not limited to, the range of 1 to 250 mA/cm$^2$. Typically, the current density is in the range of 1 to 60 mA/cm$^2$ when used to deposit copper in the manufacture of integrated circuits. The specific current density depends upon the substrate to be plated, the leveling agent selected and the like. Such current density choice is within the abilities of those skilled in the art. The applied current may be a direct current (DC), a pulse current (PC), a pulse reverse current (PRC) or other suitable current.

In general, when the present invention is used to deposit metal on a substrate such as a wafer used in the manufacture of an integrated circuit, the plating baths are agitated during use. Any suitable agitation method may be used with the present invention and such methods are well-known in the art. Suitable agitation methods include, but are not limited to, inert gas or air sparging, work piece agitation, impingement and the like. Such methods are known to those skilled in the art. When the present invention is used to plate an integrated circuit substrate, such as a wafer, the wafer may be rotated such as from 1 to 200 RPM and the plating solution contacts the rotating wafer, such as by pumping or spraying. In the alternative, the wafer need not be rotated where the flow of the plating bath is sufficient to provide the desired metal deposit.

While the process of the present invention has been generally described with reference to semiconductor manufacture, it will be appreciated that the present invention may be useful in any electrolytic process where an essentially level or planar copper deposit having high reflectivity is desired, and where reduced overplating and metal filled small features that are substantially free of voids are desired. Such processes include printed wiring board manufacture. For example, the present plating baths may be useful for the plating of vias, pads or traces on a printed wiring board, as well as for bump plating on wafers. Other suitable processes include packaging and interconnect manufacture. Accordingly, suitable substrates include lead frames, interconnects, printed wiring boards, and the like.

Plating equipment for plating semiconductor substrates are well known. Plating equipment comprises an electroplating tank which holds Cu electrolyte and which is made of a suitable material such as plastic or other material inert to the electrolytic plating solution. The tank may be cylindrical, especially for wafer plating. A cathode is horizontally disposed at the upper part of tank and may be any type substrate such as a silicon wafer having openings such as trenches and vias. The wafer substrate is typically coated with a seed layer of copper, any other metal, or any other non-metal conducting material to initiate plating thereon. A copper seed layer may be applied by chemical vapor deposition (CVD), physical vapor deposition (PVD), or the like. An anode is also preferably circular for wafer plating and is horizontally disposed at the lower part of tank forming a space between the anode and cathode. The anode is typically a soluble anode.

These bath additives are useful in combination with membrane technology being developed by various tool manufacturers. In this system, the anode may be isolated from the organic bath additives by a membrane. The purpose of the separation of the anode and the organic bath additives is to minimize the oxidation of the organic bath additives.

The cathode substrate and anode are electrically connected by wiring and, respectively, to a rectifier (power supply). The cathode substrate for direct or pulse current has a net negative charge so that Cu ions in the solution are reduced at the cathode substrate forming plated Cu metal on the cathode surface. An oxidation reaction takes place at the anode. The cathode and anode may be horizontally or vertically disposed in the tank.

The present invention is useful for depositing a metal layer, particularly a copper layer, on a variety of substrates, particularly those having variously sized apertures. For example, the present invention is particularly suitable for depositing copper on integrated circuit substrates, such as semiconductor devices, with small diameter vias, trenches or other apertures. In one embodiment, semiconductor devices are plated according to the present invention. Such semiconductor devices include, but are not limited to, wafers used in the manufacture of integrated circuits.

While the process of the present invention has been generally described with reference to semiconductor manufacture, it will be appreciated that the present invention may be useful in any electrolytic process where an essentially level or planar copper deposit having high reflectivity is desired. Accordingly, suitable substrates include lead frames, interconnects, printed wiring boards, and the like.

All percent, ppm or comparable values refer to the weight with respect to the total weight of the respective composition except where otherwise indicated. All cited documents are incorporated herein by reference.

The following examples shall further illustrate the present invention without restricting the scope of this invention.

EXAMPLES

In table 1 the structural properties of the leveler examples 1-5 are given. The filling experiments and results are described in detail in examples 6-16.

TABLE 1

| Leveler | R² | R¹ |
|---|---|---|
| 1 | n-hexane-1,6-diyl | H |
| 2 | n-octane-1,8-diyl | H |
| 3 | propane-1,3-diyl | 2-hydroxyethyl and H |
| 4 | 1,3-phenyl | H |
| 5 | n-hexane-1,6-diyl and ethane-1,2-diyl | 2-aminoethyl and H |

Example 1

Sodium dicyanamide (96% purity grade; 18.5 g), n-hexylene-1,6-diamine dihydrochloride (38.2 g) and methanol (250 ml) were placed into a 500 ml flask and the reaction mixture was stirred under reflux for 20 h. After cooling to room temperature, the resulting sodium chloride precipitate was removed by filtration and, subsequently, the solvent was distilled from the remaining product solution at 40° C. and under reduced pressure at the rotary evaporator to observe a raw material as a white solid (48.8 g). The raw material (15 g) was dissolved in hot water (400 g) and the insoluble components were removed by filtration. The remaining clear aqueous solution was heated to 100° C. and 20 mbar at the rotary evaporator to remove the solvent. Leveler 1 was received as a white solid (12 g).

Example 2

Sodium dicyanamide (96% purity grade; 18.6 g) and n-octylene-1,8-diamine (28.8 g) were placed into a 250 ml flask and the reaction mixture was heated to 70° C. Then, concentrated hydrochloric acid (39.4 g) was added dropwise resulting in a temperature increase to 102.5° C. A constant nitrogen stream was applied and, then, the temperature was increased to 180° C. and water was destilled off. After 30 min the heating was turned off, the distillation condenser was replaced by a reflux condenser and methanol (120 ml) was poured into the reaction mixture. After cooling to room temperature, the resulting sodium chloride precipitate was removed by filtration and, subsequently, the solvent was distilled from the remaining product solution at 40° C. and under reduced pressure at the rotary evaporator. Leveler 2 was received as a white solid (53.3 g).

Example 3

Sodium dicyanamide (96% purity grade; 37.0 g) and N-(2-hydroxyethyl)-1,3-propandiamine (49.0 g) were placed into a 250 ml flask and concentrated hydrochloric acid (79.5 g) was added dropwise resulting in a temperature increase to 95° C. Then, the reaction mixture was heated to 180° C. under a constant nitrogen stream to remove water resulting in an exothermic reaction and a temperature increase to 216° C. After 7 min, the distillation condenser was replaced by a reflux condenser and methanol (120 ml) was added. After cooling to room temperature, the resulting sodium chloride precipitate was removed by filtration and, subsequently, the solvent was distilled from the remaining product solution at 40° C. and under reduced pressure at the rotary evaporator. Leveler 3 was received as a brown solid (87.0 g).

Example 4

Sodium dicyanamide (96% purity grade; 18.6 g) and 1,3-phenylendiamine (21.6 g) were placed into a 250 ml flask and heated to 100° C. Then, concentrated hydrochloric acid (39.4 g) was added dropwise resulting in a temperature increase to 109° C. The reaction mixture was heated to 113° C. under a constant nitrogen stream for water removal. Due to the high viscosity, the distillation condenser was replaced by a reflux condenser immediately and methanol (120 ml) was added. After cooling to room temperature, the resulting sodium chloride precipitate was removed by filtration and, subsequently, the solvent was distilled from the remaining product solution at 40° C. and under reduced pressure at the rotary evaporator. Leveler 4 was received as a brown solid (41.6 g).

Example 5

Sodium dicyanamide (96% purity grade; 18.6 g), diethylentriamine (2.0 g) and n-hexylene-1,6-diamine (20.9 g) were placed into a 250 ml flask and the reaction mixture was heated to 70° C. Then, concentrated hydrochloric acid (39.4 g) was added dropwise resulting in a temperature increase to 105° C. A constant nitrogen stream was applied to remove water and, then, the temperature was increased to 180° C. At this temperature, the distillation condenser was replaced by a reflux condenser and methanol (120 ml) was poured into the reaction mixture. After cooling to room temperature, the resulting sodium chloride precipitate was removed by filtration and, subsequently, the solvent was distilled from the remaining product solution at 40° C. and under reduced pressure at the rotary evaporator. Leveler 5 was received as a brownish solid (44.1 g).

Comparative Example 6

A plating bath was prepared by combining DI water, 40 g/l copper as copper sulfate, 10 g/l sulfuric acid, 0.050 g/l chloride ion as HCl, 0.028 g/l of SPS and 2.00 ml/l of a 5.3% by weight solution in DI water of a suppressor being a EO/PO copolymer having a molecular weight of <13000 g/mole and terminal hydroxyl groups (PS151).

Figure 3A:
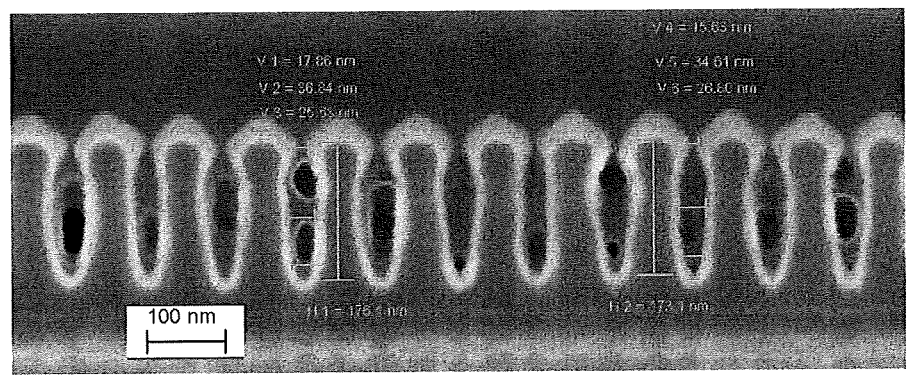
FIG. 3A The SEM image of trenches comprising a copper seed having 16 to 37 nm trench width, 173 to 176 nm trench depth.

A copper layer was electroplated onto a wafer substrate with feature sizes shown in FIG. 3A (16 to 37 nm trench width, 173 to 176 nm trench depth) provided with a copper seed layer by contacting the wafer substrate with the above described plating bath at 25 degrees C. applying a direct current of −5 mA/cm² for 6 s. The thus electroplated copper layer was cross-sectioned and investigated by SEM inspection.

Figure 3B:
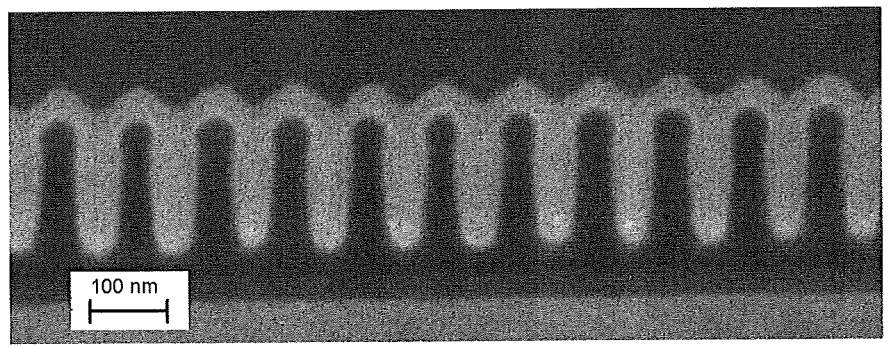
FIG. 3B The SEM image of fully filled trenches resulting from a copper electroplating according to Example 7 using a plating bath with leveler 1 as prepared in example 1 according to the present invention. The trenches are completely filled without exhibiting any defects like voids or seams thus showing that there is no interference with the gapfilling by the leveling agent.
Figure 3C:
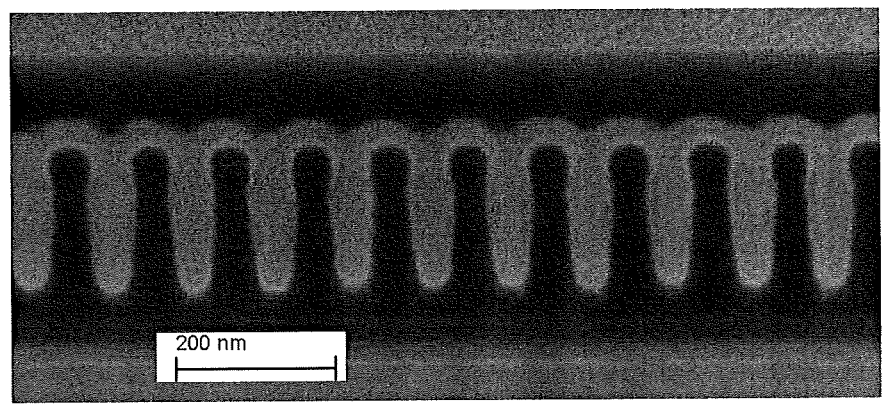
FIG. 3C The SEM image of fully filled trenches resulting a copper electroplating according to Comparative Example 6 providing the SEM image of fully filled trenches without exhibiting any defects like voids or seams.

The result is shown in FIG. 3C providing the SEM image of fully filled trenches without exhibiting any defects like voids or seams.

Example 7

The procedure of example 6 was repeated except that 0.625 ml/l of a 1% by weight aqueous solution of polymeric biguanide compound leveler 1 as prepared in example 1 was added to the plating bath.

A copper layer was electroplated onto a wafer substrate as described in example 6. The thus electroplated copper layer was cross-sectioned and investigated by SEM inspection.

The result using a plating bath with leveler 1 as prepared in example 1 according to the present invention is shown in FIG. 3B. The 16 to 37 nanometer wide trenches are completely filled without exhibiting any defects like voids or seams thus showing that there is no interference with the gapfilling by the leveling agent.

Comparative Example 8

A plating bath according to comparative example 6 was prepared.

Figure 4A:
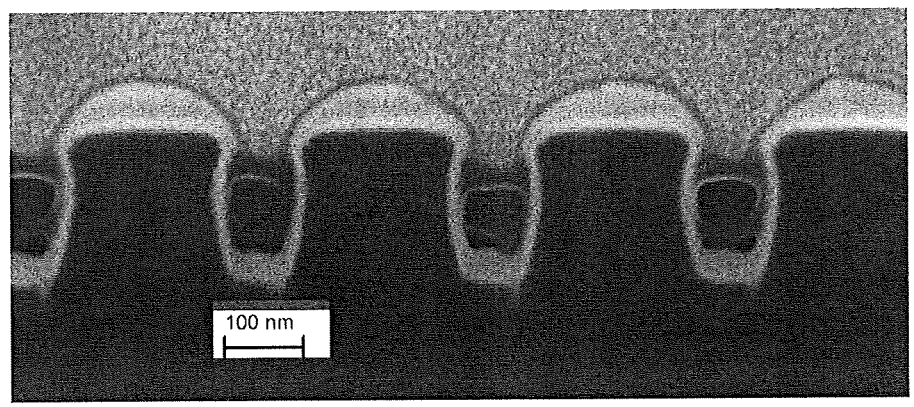
FIG. 4A The SEM image of trenches having 100 nm trench widths comprising a copper seed.

A copper layer was electroplated onto a wafer substrate with feature sizes shown in FIG. 4A (100 nm trench width) provided with a copper seed layer by contacting the wafer substrate with the above described plating bath at 25 degrees C. applying a direct current of −5 mA/cm$^2$ for 27 s followed by −10 mA/cm$^2$ for 27 s. The thus electroplated copper layer was cross-sectioned and investigated by SEM inspection.

Figure 4B:
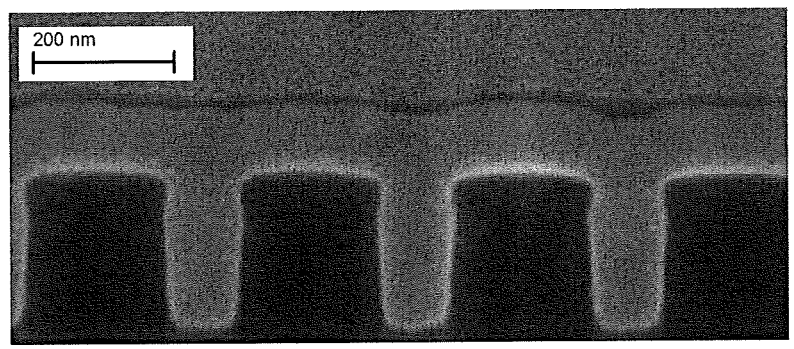
FIG. 4B The SEM image of fully filled trenches resulting from a copper electroplating according to Example 9 without exhibiting any defects like voids or seams while efficiently preventing bump formation over the 13 nm wide trenches.
Figure 4C:
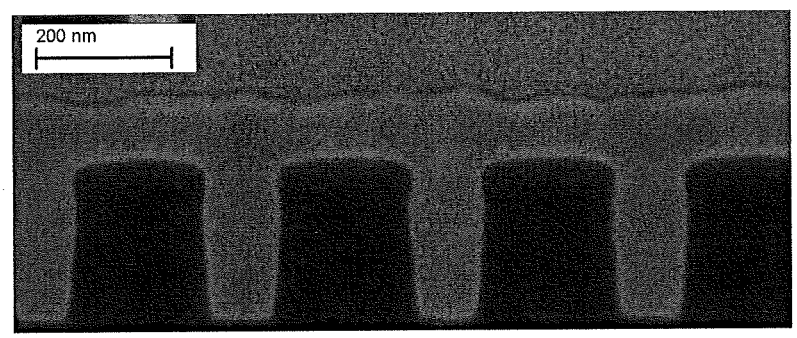
FIG. 4C The SEM image of fully filled trenches resulting from a copper electroplating according to Example 10 without exhibiting any defects like voids or seams while still efficiently preventing bump formation over the 100 nm wide trenches.
Figure 4D:
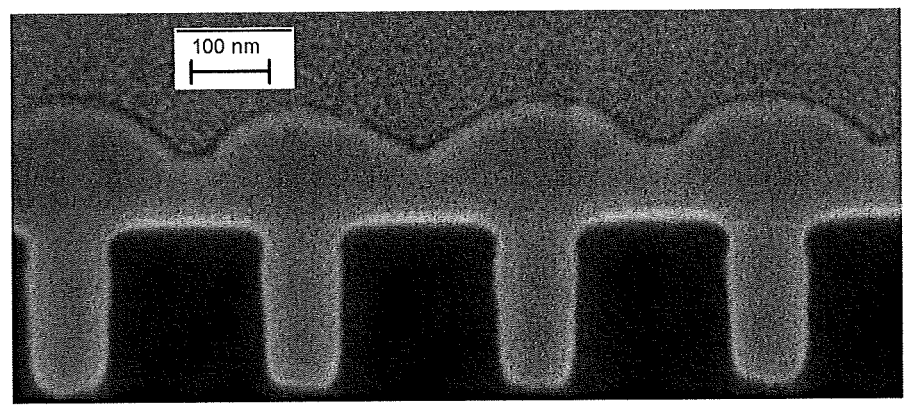
FIG. 4D The SEM image of fully filled trenches resulting from a copper electroplating according to Comparative Example 8 revealing bump formation over the 100 nm wide trenches.

The result is shown in FIG. 4D providing the SEM image of fully filled trenches without exhibiting any defects like voids or seams. FIG. 4D clearly reveals bump formation over the 100 nm wide trenches.

Example 9

A plating bath according to example 7 was prepared.

A copper layer was electroplated onto a wafer substrate with feature sizes shown in FIG. 4A (100 nm trench width) provided with a copper seed layer by contacting the wafer substrate with the above described plating bath at 25 degrees C. applying a direct current of −5 mA/cm$^2$ for 27 s followed by −10 mA/cm$^2$ for 27 s. The thus electroplated copper layer was cross-sectioned and investigated by SEM inspection.

The result is shown in FIG. 4B providing the SEM image of fully filled trenches without exhibiting any defects like voids or seams while efficiently preventing bump formation over the 100 nm wide trenches.

Example 10

The plating bath of example 6 was repeated except that 0.3125 ml/l of a 1% by weight aqueous solution of polymeric biguanide compound leveler 1 as prepared in example 1 was added to the plating bath.

A copper layer was electroplated onto a wafer substrate with feature sizes shown in FIG. 4A (100 nm trench width) provided with a copper seed layer by contacting the wafer substrate with the above described plating bath at 25 degrees C. applying a direct current of −5 mA/cm$^2$ for 27 s followed by −10 mA/cm$^2$ for 27 s. The thus electroplated copper layer was cross-sectioned and investigated by SEM inspection.

The result is shown in FIG. 4C providing the SEM image of fully filled trenches without exhibiting any defects like voids or seams while still efficiently preventing bump formation over the 100 nm wide trenches.

The plating experiments with substrates carrying 100 nm wide trenches as described in examples 9 to 10 (FIGS. 4B and 4C) compared to example 8 (FIG. 4A) reveal that the invention provides defect-free and particularly void-free gap filling while efficiently levelling. Even in decreased concentration of leveler 1 efficient levelling is observed (FIG. 4B versus FIG. 4C). The experiment accomplished without any levelling agent in the plating bath solution (FIG. 4D) clearly reveals bump formation over the trenches and thus indicates the levelling efficiency of the invention while providing defect-free Cu deposits.

Additionally plating experiments have been performed with substrates carrying 16 to 37 nm wide trenches (FIG. 3A) and plating bath solutions containing either leveler 1 according to the present invention (FIG. 3B) or no leveler (FIG. 3C). The SEM image shown in FIG. 3B reveals that leveler 1 provides defect-free, also meaning void-free, gap fill as also found with the substrate plated without any levelling agent in the plating bath solution (FIG. 3C).

The use of a polymeric biguanide compound according to the present invention as levelling agent thus provides excellent levelling efficiency without interfering with the bottom-up-fill causing voids.

Comparative Example 11

A copper plating bath was prepared by combining 40 g/l copper as copper sulfate, 10 g/l sulfuric acid, 0.050 g/l chloride ion as HCl, 0.100 g/l of an EO/PO copolymer suppressor, and 0.028 g/l of SPS and DI water. The EO/PO copolymer suppressor had a molecular weight of <5000 g/mole and terminal hydroxyl groups.

A copper layer was electroplated onto a structured silicon wafer substrate purchased from SKW Associate Inc. containing trenches arranged as shown in FIGS. 2A and 2B. These substrates exhibited two test areas:
(i) a first area comprising densely arranged parallel trenches of 130 nm widths (w, see FIG. 2A) and a depth (d) of approximately 250 nm, and
(ii) a second area comprising densly arranged parallel trenches of 250 nm width and a depth of approximately 250 nm.

Such wafer substrates were brought into contact with the above described plating bath at 25 degrees C. and a direct current of 5 mA/cm$^2$ for 120 s followed by −10 mA/cm$^2$ for 60 s was applied.

The thus electroplated copper layer was investigated by profilometry inspection with a Dektak 3, Veeco Instruments Inc. The height difference between the patterned area (distance a) and unpatterned area (distance b) (see FIG. 2A) was measured for both areas (i) and (ii).

Figure 5A:
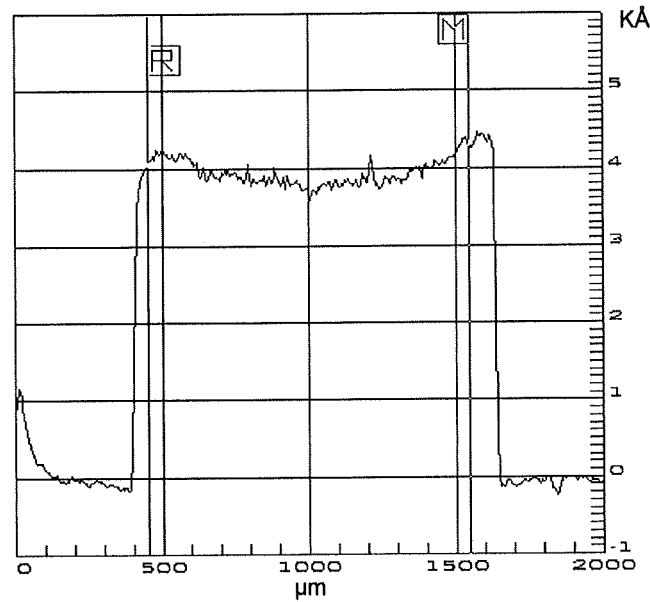
FIG. 5A the profilometry results for area (i) without using a leveling agent according to Comparative Example 11 showing a higher copper deposit over the patererned area compared to the unpatterned area.
Figure 5B:
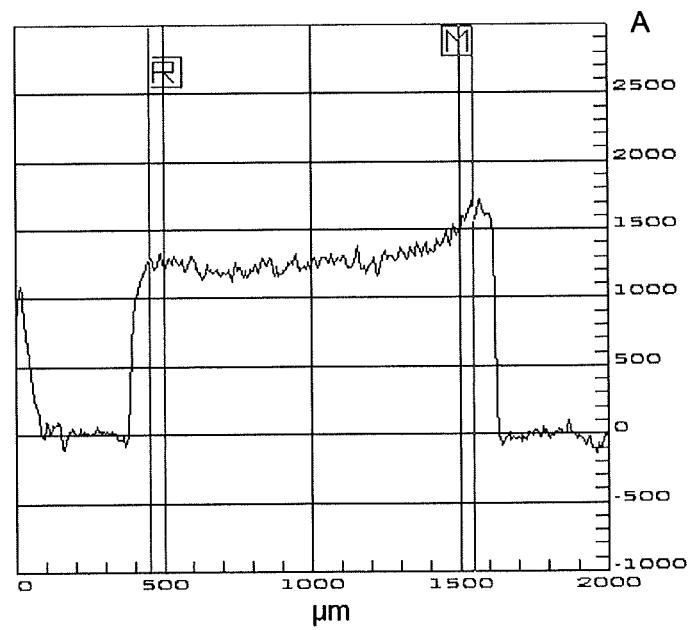
FIG. 5B the profilometry results for area (ii) without using a leveling agent according to Comparative Example 11 showing a higher copper deposit over the patererned area compared to the unpatterned area.

FIG. 5A shows the profilometry results for area (i) without using a leveling agent, and FIG. 5B shows the results for area (ii). Both, FIGS. 5A and 5B show a higher copper deposit over the patterered area compared to the unpatterned area. FIGS. 5A and 5B show a significant mounding. The measured values for the 0.130 micrometer and 0.250 micrometer featured area are listed in table 2.

Example 12

The procedure of example 11 was repeated except that 1 ml/l of a stock solution containing 1% (w/w) of the active leveling agent of example 1 was added to the plating bath.

A copper layer was electroplated onto a wafer substrate as described in example 11. The thus electroplated copper layer was investigated by profilometry as described in example 11.

Figure 6A:
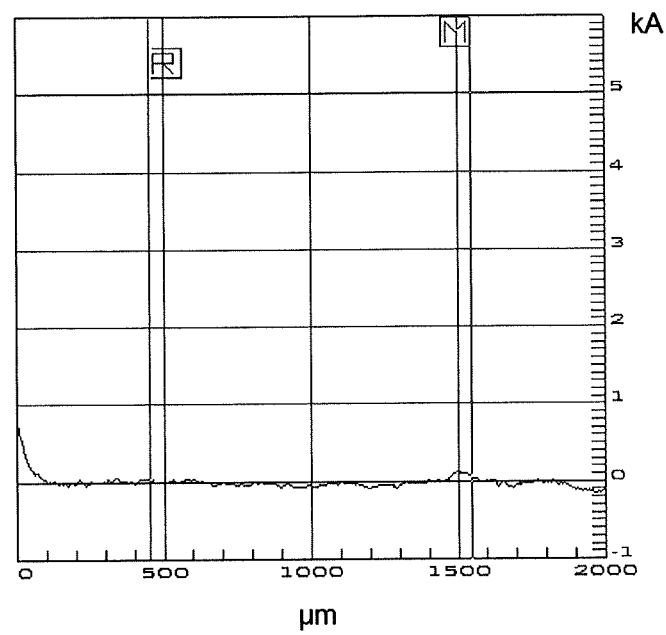
FIG. 6A the profilometry results for area (i) using the leveling agent from example 1 according to Example 12 showing essentially no mounding over the patterned area compared to the unpatterned area.
Figure 6B:
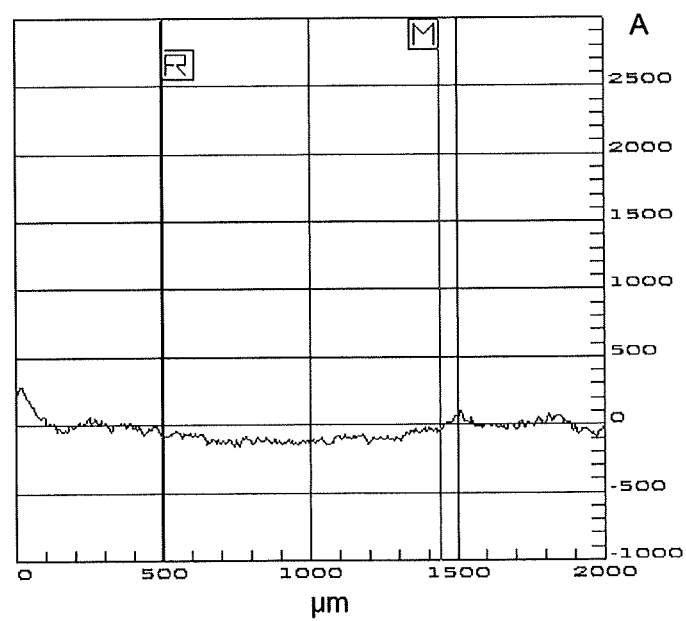
FIG. 6B the profilometry results for area (ii) using the leveling agent from example 1 according to Example 12 showing essentially no mounding over the patterned area compared to the unpatterned area.

FIG. 6A shows the profilometry results for area (i) using the leveling agent from example 1. FIG. 6B shows the results for area (ii). Both, FIGS. 6A and 6B show essentially no mounding over the patterned area compared to the unpatterned area. The measured values for the 0.130 micrometer and 0.250 micrometer featured area are listed in table 2.

Example 13

The procedure of example 11 was repeated except that 1 ml/l of a stock solution containing 1% (w/w) of the active leveling agent of example 2 was added to the plating bath.

A copper layer was electroplated onto a wafer substrate as described in example 11. The thus electroplated copper layer was investigated by profilometry as described in example 11.

The values obtained from profilometry, as listed in table 2, show an excellent reduction of the mounding compared to example 11 without any leveling agent.

Example 14

The procedure of example 11 was repeated except that 1 ml/l of a stock solution containing 1% (w/w) of the active leveling agent of example 3 was added to the plating bath.

A copper layer was electroplated onto a wafer substrate as described in example 11. The thus electroplated copper layer was investigated by profilometry as described in example 11.

The values obtained from profilometry, as listed in table 2, show a significant reduction of the mounding compared to example 11 without any leveling agent.

Example 15

The procedure of example 11 was repeated except that 1 ml/l of a stock solution containing 1% (w/w) of the active leveling agent of example 4 was added to the plating bath.

A copper layer was electroplated onto a wafer substrate as described in example 11. The thus electroplated copper layer was investigated by profilometry as described in example 11.

The values obtained from profilometry, as listed in table 2, show an excellent reduction of the mounding compared to example 11 without any leveling agent.

Example 16

The procedure of example 11 was repeated except that 1 ml/l of a stock solution containing 1% (w/w) of the active leveling agent of example 5 was added to the plating bath.

A copper layer was electroplated onto a wafer substrate as described in example 11. The thus electroplated copper layer was investigated by profilometry as described in example 11.

The values obtained from profilometry, as listed in table 2, show an excellent reduction of the mounding compared to example 11 without any leveling agent.

TABLE 2

| Leveler | mounding [a-b, see FIG. 2A] | |
| --- | --- | --- |
| | area (i) 0.130 micrometer featured area | area (ii) 0.250 micrometer featured area |
| Prior art (example 11) | 370 nm | 123 nm |
| 1 (example 12) | −4 nm | −10 nm |
| 2 (example 13) | 61 nm | 12 nm |
| 3 (example 14) | 194 nm | 91 nm |
| 4 (example 15) | 96 nm | −5 nm |
| 5 (example 16) | 77 nm | 38 nm |

The invention claimed is:

1. A process for depositing a copper layer on a substrate, comprising:
   a) contacting a metal plating bath with the substrate, and
   b) applying a current density to the substrate for a time sufficient to deposit the copper layer onto the substrate,
   wherein the metal plating bath comprises a composition comprising:
      a source of copper ions,
      an accelerating agent,
      a leveling agent,
      a suppressing agent comprising a polyalkylene oxide, and
      halide ions,
   wherein the accelerating agent comprises a compound having a formula $M^4O_3X^4-R^{41}-(S)_d-R^{42}$;
   wherein:
      $M^4$ is a hydrogen or an alkali metal;
      $X^A$ is P or S;
      d is 2 or 3;
      $R^{41}$ is selected from the group consisting of a C1-C8 alkyl group or heteroalkyl group, an aryl group, and a heteroaromatic group; and,
      $R^{42}$ is H or $(-S-R^{41'}X^{A'}O_3M^{4'})$;
         wherein $R^{41'}$ is selected from the group consisting of a C1-C8 alkyl group or heteroalkyl group, an aryl group, and a heteroaromatic group;
         $X^{A'}$ is P or S; and,
         $M^{4'}$ is a hydrogen or an alkali metal; and,
   wherein the leveling agent comprises:
      (i) a linear or branched, polymeric biguanide compound comprising the structural unit of formula L1

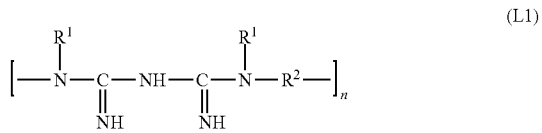

(L1)

wherein
   $R^1$ is, each independently, selected from the group consisting of an H atom and an organic radical having from 1 to 20 carbon atoms;
   $R^2$ is a divalent organic radical having from 1 to 20 carbon atoms, optionally comprising polymeric biguanide branches; and,
   n is an integer of 2 or more;
   wherein at least one $R^1$ comprises an organic radical having from 1 to 20 carbon atoms or $R^2$ comprises an aryl or arylalkyl group; or
      (ii) a corresponding salt of the polymeric biguanide compound of (i) formed by the reaction of the biguanide groups with organic or inorganic acids.

2. The process according to claim 1, wherein $R^1$ is each independently selected from the group consisting of an H atom and substituted or unsubstituted $C_1$ to $C_{10}$ alkyl radicals.

3. The process according to claim 1, wherein at least one $R^1$ is an H atom.

4. The process according to claim 1, wherein $R^2$ is selected from the group consisting of substituted or unsubstituted linear $C_2$ to $C_8$ alkanediyl.

5. The process according to claim 1, wherein n is from 2 to 6000.

6. The process according to claim 1, wherein the number average molecular weight $M_n$ of the polymeric biguanide compound, determined by gel permeation chromatography, is greater than 300 g/mol.

7. The process according to claim 1, wherein the leveling agent is prepared by reacting
   a dicyanamide compound,
   at least one amino compound comprising at least two primary and/or secondary amino groups, and
   an inorganic or organic protic acid.

8. The process according to claim 7, wherein the at least one amino compound is an aliphatic or aromatic diamine, triamine, multiamine, or mixtures thereof.

9. The process according to claim 7, wherein the at least one amino compound is a terminal diamine.

10. The process according to claim 1, wherein the accelerating agent is selected from the group consisting of compounds of formula $M^4O_3S\text{—}R^{41}\text{—}S\text{—}S\text{—}R^{41'}\text{—}SO_3M^4$, wherein $M^4$ is a hydrogen or an alkali metal, $R^{41'}$ is selected from C1-C8 alkyl group or heteroalkyl group, an aryl group or a heteroaromatic group, and $R^{41'}$ is selected from $R^{41}$, wherein $R^{41'}$ may be identical to or different from $R^{41}$.

11. The process according to claim 10, wherein the accelerating agent is bis-(3-sulfopropyl)-disulfide.

12. The process according to claim 1, wherein the substrate comprises micrometer or nanometer sized features and the deposition is performed to fill the micrometer or nanometer sized features.

13. The process according to claim 12, wherein the micrometer or nanometer-sized features have a size from 1 to 1000 nm and/or an aspect ratio of 4 or more.

14. The process according to claim 12, wherein the micrometer or submicrometer-sized features have a size from 1 to 100 nm.

15. The process according to claim 1, wherein at least one $R^1$ is a hydroxyalkyl or an aminoalkyl.

16. The process according to claim 1, wherein $R^2$ is 1,3-phenyl or xylenediyl.

* * * * *